US006976102B1

(12) United States Patent
Groen et al.

(10) Patent No.: US 6,976,102 B1
(45) Date of Patent: Dec. 13, 2005

(54) INTEGRATED CIRCUIT WITH AUTO NEGOTIATION

(75) Inventors: Eric D. Groen, Ankeny, IA (US);
Charles W. Boecker, Ames, IA (US);
William C. Black, Ames, IA (US);
Scott A. Irwin, Ames, IA (US); Joseph N. Kryzak, Ames, IA (US); Aaron J. Hoelscher, Ankeny, IA (US)

(73) Assignee: Xilinx, Inc., San Jose, CA (US)

( * ) Notice: Subject to any disclaimer, the term of this patent is extended or adjusted under 35 U.S.C. 154(b) by 54 days.

(21) Appl. No.: 10/660,159

(22) Filed: Sep. 11, 2003

(51) Int. Cl.[7] .............................................. G06F 13/38
(52) U.S. Cl. ..................... 710/72; 710/105; 710/100; 710/106; 326/38
(58) Field of Search .................... 326/38–41; 710/100, 710/126, 107, 113, 5, 62, 260

(56) References Cited

U.S. PATENT DOCUMENTS

| 5,999,561 | A | * | 12/1999 | Naden et al. ................ 375/142 |
| 6,065,087 | A | * | 5/2000 | Keaveny et al. ............ 710/315 |
| 6,370,603 | B1 | * | 4/2002 | Silverman et al. ............ 710/72 |
| 6,639,939 | B1 | * | 10/2003 | Naden et al. ................ 375/140 |
| 6,813,651 | B1 | * | 11/2004 | Smith et al. .................. 710/20 |

OTHER PUBLICATIONS

U.S. Appl. No. 10/319,051, filed Dec. 13, 2002, Curd et al.
Xilinx, Inc.; "Aurora Protocol Specification"; SP002 (v1.1), Feb. 14, 2003; available from Xilinx, Inc., 2100 Logic Drive, San Jose, California 95124 or www.xilinx.com; pp. 1-63.
Xilinx, Inc., "Using FPGAs to Design Gigabit Serial Backplanes"; Programmable World 2002, The Forum for the New Era of Systems Design; Apr. 17, 2002; pp. A1-2 through A1-34.

* cited by examiner

*Primary Examiner*—Vibol Tan
(74) *Attorney, Agent, or Firm*—W. Eric Webostad; Kim Kanzaki

(57) ABSTRACT

Method and apparatus for auto-negotiation of a programmable logic device for any of a plurality of communication protocols is described. The programmable logic device is programmed for auto negotiation to establish a communication session. The programmable logic device has access to transceiver attributes. A portion of the transceiver attributes are selected in response to session information from the auto negotiation. The portion of the transceiver attributes selected are for configuring at least one transceiver for a communication protocol.

21 Claims, 5 Drawing Sheets

INTEGRATED CIRCUIT WITH AUTO NEGOTIATION

FIELD OF THE INVENTION

One or more aspects of the invention relate generally to an integrated circuit with communication session auto-negotiation programmed therein and more particularly to, configuration of a programmable logic device responsive to auto negotiation.

BACKGROUND OF THE INVENTION

Traditional communication systems include multiple interface circuit boards ("line cards"). Conventionally, each line card is for a specific protocol and a specific data rate. Thus, for example, a line card may be dedicated to an optical carrier ("OC") and a data rate for such an OC, such as OC48 at 2.488 Gigabits per second ("Gbps"). To support combinations of multiple protocols and multiple data rates, multiple dedicated line cards, one each for each protocol and data rate combination, are used. For example, a switch in a telecommunication network may have multiple line cards to support multiple combinations. As each line card is dedicated to a protocol and data rate, conventionally a change in protocol or data rate means replacing a line card.

Accordingly, it would be desirable and useful to provide a single line card capable of supporting multiple protocols and data rates. It would be additionally desirable and useful if such a line card could be reconfigured to support other protocol and data rate combinations.

SUMMARY OF THE INVENTION

An aspect of the invention is a programmable logic device, comprising: transceivers; programmable circuitry coupled to the transceivers; and memory coupled to the transceivers. The programmable circuitry is configured to receive a frequency locked signal from at least one of the transceivers and to establish a data rate responsive to the frequency locked signal, and is further programmed to send and receive session information to and from the transceivers to establish a communication session.

Another aspect of the invention is a method for establishing a communication session. The method comprises programming a programmable logic device for: negotiating at least one channel property, negotiating at least one encoding scheme, and negotiating a protocol link layer. A data rate is set responsive to the at least one channel property negotiated. Transceiver attributes are selected in response to the at least one encoding scheme and the protocol link layer, and at least one transceiver is configured in response to the transceiver attributes selected.

An aspect of the invention is a method for configuring a line interface having programmable logic circuitry and transceivers. The method comprises obtaining session information for a session; selecting transceiver attributes in response to the session information; reading a current configuration of a portion of the transceivers; and configuring the portion of the transceivers in response to the transceiver attributes selected and the current configuration read.

An aspect of the invention is an integrated circuit, comprising: transceivers; and programmable logic programmed for auto negotiation to establish a communication session for a selected one of a plurality of communication protocols, where the programmable logic has access to transceiver attributes for the plurality of communication protocols. A portion of the transceiver attributes are selected in response to session information obtained from an auto-negotiation session. The portion of the transceiver attributes are used to configure at least one transceiver of the transceivers for a communication protocol of the plurality of communication protocols selected responsive to the session information.

An aspect of the invention is an integrated circuit, comprising: transceivers; and programmable logic programmed for auto negotiation to establish communication sessions for selected ones of a plurality of communication protocols, where the programmable logic has access to transceiver attributes for the plurality of communication protocols. Each portion of the transceiver attributes is selected in response to session information obtained from a respective auto-negotiation session to respectively configure at least one transceiver of the transceivers, where the at least one transceiver of the transceivers is respectively configured for a respective communication session of the communication sessions. The communication session uses a communication protocol of the plurality of communication protocols, where the communication protocol is responsive to the session information obtained from the respective auto-negotiation session.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
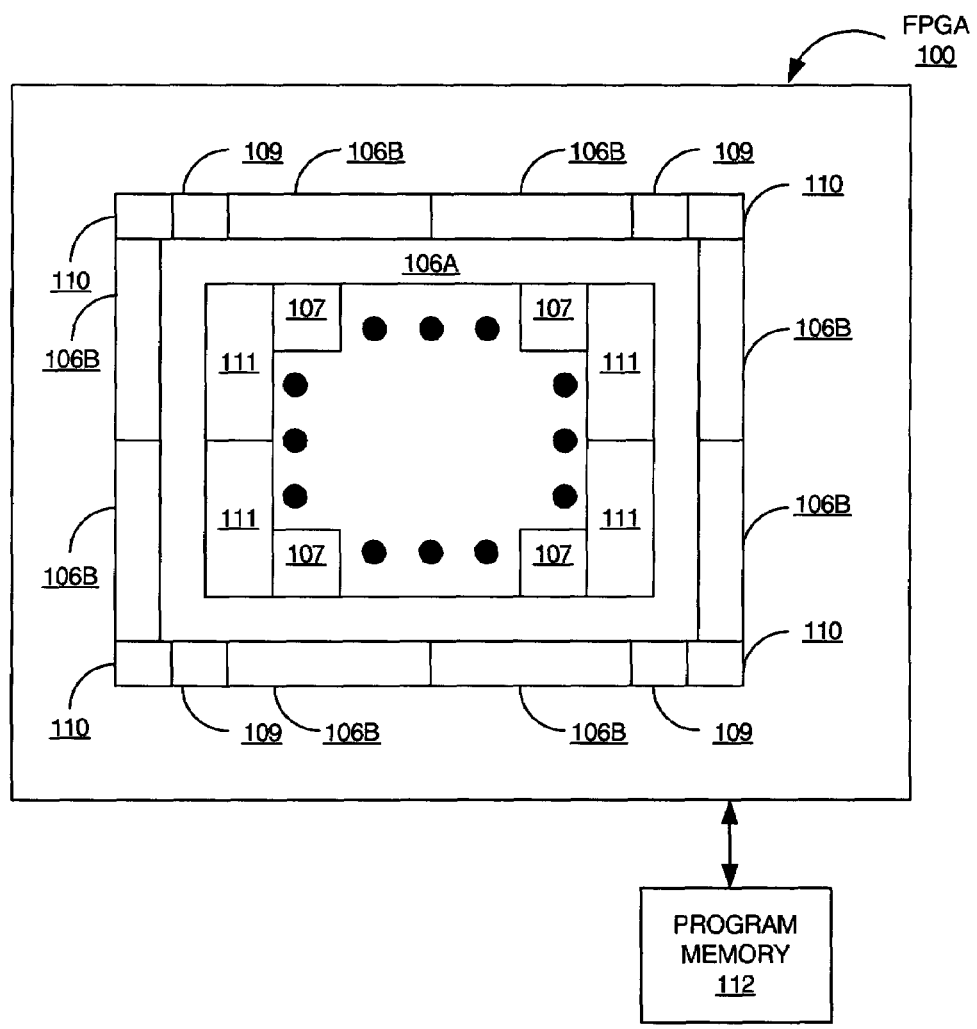
FIG. 1 is a high-level block diagram depicting an exemplary embodiment of an FPGA.

FIG. 1 is a high-level block diagram depicting an exemplary embodiment of an FPGA 100. An FPGA 100 is an example of an integrated circuit that may be used for implementing one or more aspects of the invention. However, other programmable logic device ("PLD") integrated circuits other than FPGAs, including complex PLDs ("CPLD") and other integrated circuits with configurable logic, may be used.

FPGA 100 includes configurable logic blocks (CLBs) 107, I/O routing ring 106A, memory, such as random access memory 111, delay lock loops (DLLs) 109, multiply/divide/de-skew clock circuits 110, and programmable input/output blocks (IOBs) 106B. IOBs 106B may include transceivers, such as multi-gigabit transceivers ("MGTs"). DLLs 109 and clock circuits 110 collectively provide digital clock modules or managers ("DCMs"). External memory 112 may be coupled to FPGA 100 to store and provide a configuration bitstream to configure FPGA 100, namely, to program one or more memory cells to configure CLBs 107 and IOBs 106B. Alternatively or in addition to external memory 112, FPGA may have internal memory 111 for storing and providing a configuration bitstream.

Figure 2:
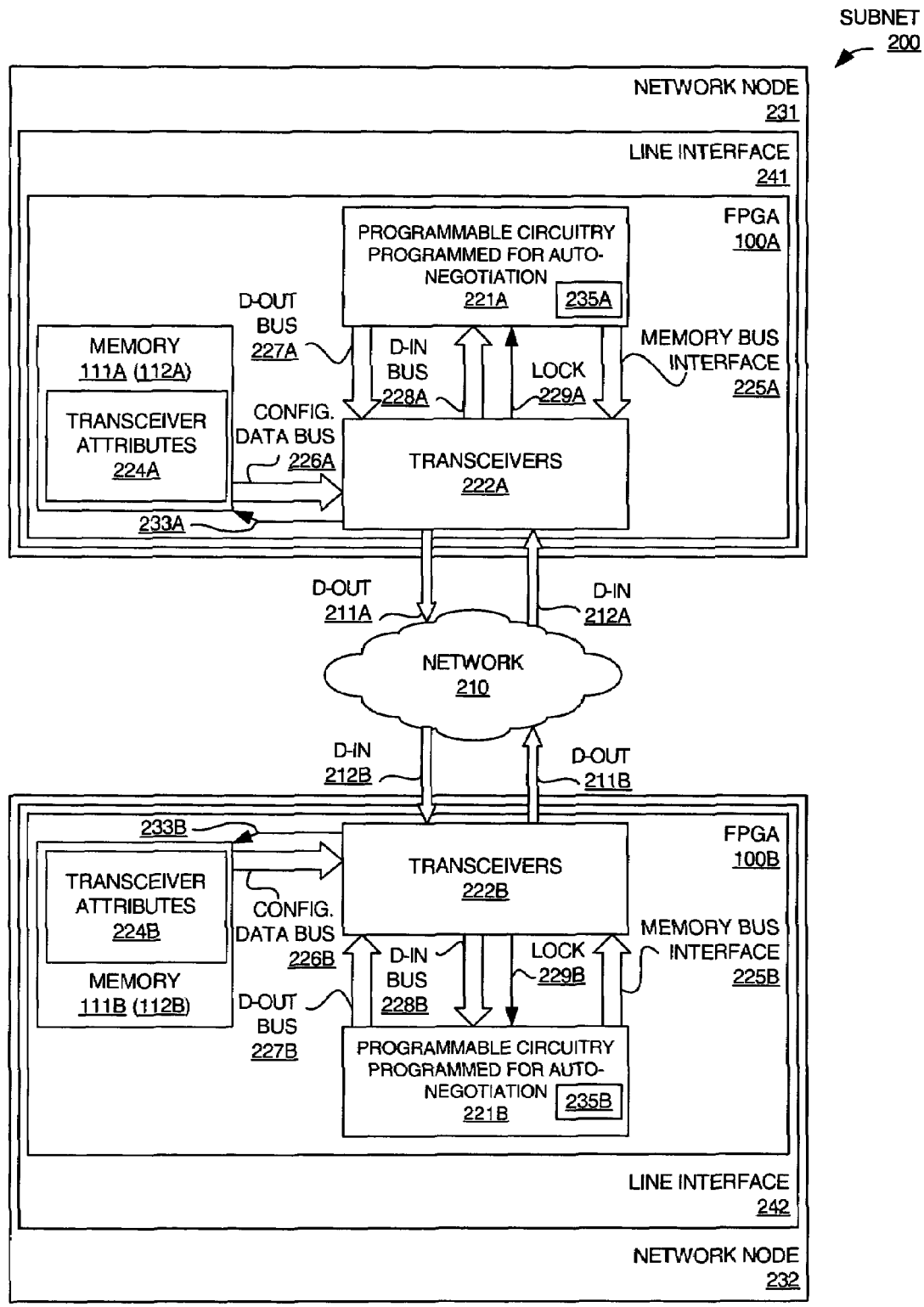
FIG. 2 is a high-level block diagram depicting an exemplary embodiment of a sub-network ("subnet").

FIG. 2 is a high-level block diagram depicting an exemplary embodiment of a sub-network ("subnet") 200. Subnet 200 includes a plurality of network nodes, such as network nodes 231 and 232, coupled to one another via a network 210, which may be a portion of the Internet. Data output ("D-out") 211A may be sent from network node 231 to network 210 and on as data input ("D-in") 212B to network node 232. D-out 211B may be sent from network node 232 to network 210 and on as D-in 212A to network node 232. Network nodes 231 and 232 may each include one or more line interfaces, such as line interfaces 241 and 242, respectively. Line interface 241 and line interface 242 may each include an FPGA, such as FPGAs 100A and 100B, respectively. Notably, FPGAs 100A and 100B (collectively and singly respectively referred to as FPGAs and FPGA 100) are each configured for adaptation to networking environment, such as physical link and protocol adaptation. Notably, one of line interfaces 241 and 242 may alternatively be a conventional line card, and the other one of line interfaces 241 and 242 would have an FPGA 100 configured for adaptation to networking environment.

FPGAs 100 have same circuitry as delineated with same reference numbers other than a suffix modifier of A for FPGA 100A and B for FPGA 100B. Thus, rather than repeating descriptions, only FPGA 100A is described in detail.

FPGA 100A includes a plurality of input/output ("I/O") transceivers 222A, programmable circuitry programmed for auto-negotiation 221A and embedded memory 111A. Alternatively, external memory 112A or a combination of external memory 112A and embedded memory 111A may be used; however, for clarity, it is assumed that only embedded memory 111A is employed.

Programmable circuitry programmed for auto-negotiation 221A sends information to and from transceivers 222A via D-out bus 227A and D-in bus 228A, respectively. Such information may be sent via transceivers 222A to network 210 for FPGA 100B. Programmable circuitry may include registers 235A for storing incoming data from D-in bus 228A for establishing a communication session. This information is for auto-negotiation of physical link and protocol for establishing a communication session between network nodes 231 and 232.

In response to exchanged information regarding physical link and protocol for establishment of a communication session, programmable circuitry programmed for auto-negotiation 221A provides information for configuring transceivers 222A via memory bus interface 225. Responsive to such information via memory bus interface 225, a select signal 233A is generated to select a portion of transceiver attributes from transceiver attributes 224A stored in memory 111A. The transceiver attributes selected are provided as a data bitstream to transceivers 222A via configuration data bus 226A. Thus, transceivers 222A are configured for an auto-negotiated physical link and protocol with selected transceiver attributes for a communication session. Notably, different portions of transceivers 222A may be configured for different or same physical link or protocol link layers.

As part of an auto-negotiation, a lock indicator signal 229A is provided responsive to frequency locking circuitry of at least one transceiver of transceivers 222A obtaining a lock to incoming data. This lock indicator signal 229A indicates to programmable circuitry programmed for auto-negotiation 221A that a data rate has been successfully established. FPGA 100A transceivers 222A may be multi-gigabit transceivers. Accordingly, programmable circuitry programmed for auto-negotiation 221A may be configured to negotiate any of a plurality of known physical links and protocols, including, but not limited to, those for Ethernet, Synchronous Optical Network ("SONET"), Synchronous Digital Hierarchy ("SDH"), Asynchronous Transfer Mode ("ATM"), Fiber Channel, Peripheral Component Interconnect ("PCI") Express, and InfiniBand.

Figure 3:
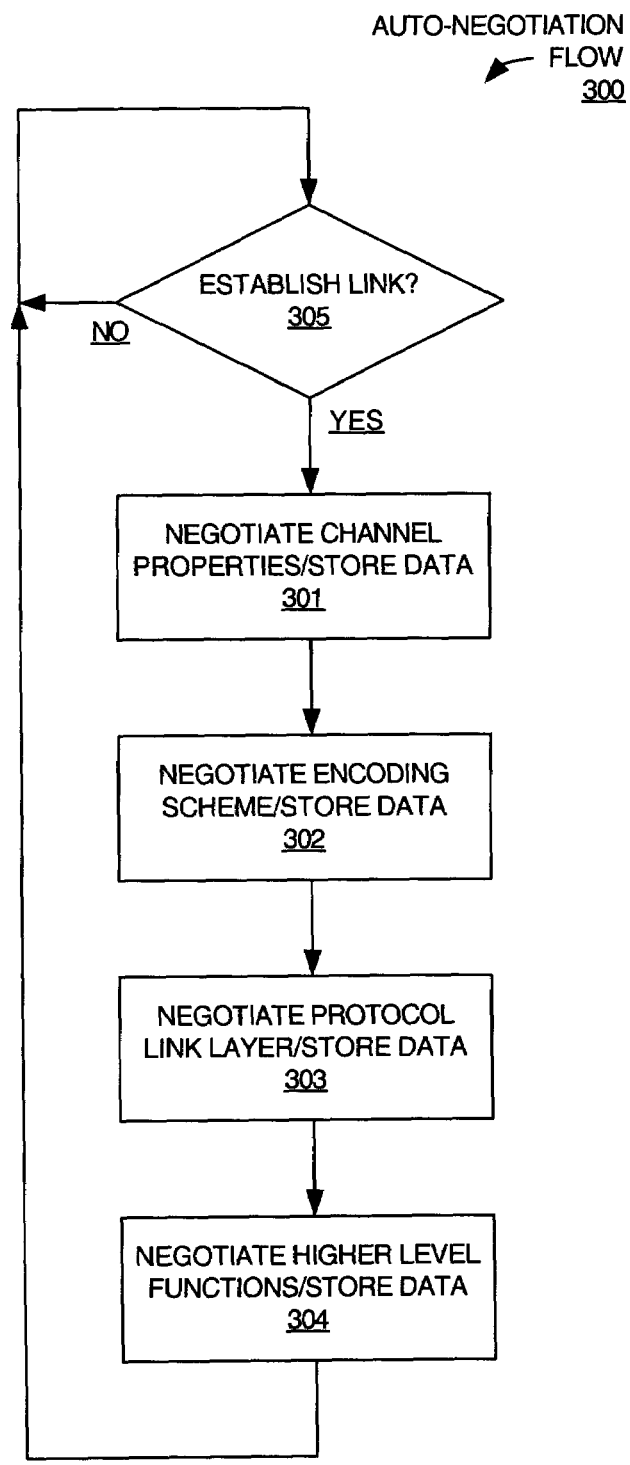
FIG. 3 is a high-level flow diagram of an auto-negotiation flow.

FIG. 3 is a high-level flow diagram of an auto-negotiation flow 300. At 301, channel properties are negotiated. Examples of channel properties that may be negotiated at 301 are signal swing/bit rate, transmit pre-emphasis and receive post-equalization, among others. For example, Fiber Channel layer FC-0 is the physical link layer for which channel properties are negotiated. At 302, encoding schemes are negotiated. Examples of encoding schemes that may be negotiated at 302 are: SONET/SDH scrambling; 8B/10B encoding for Fiber Channel Gigabit Ethernet and PCI Express, and 64B/66B encoding for 10G Fiber Channel and 10G Ethernet, among others. For example, for Fiber Channel layer FC-1 is a transmission protocol layer that includes encoding and decoding rules which are negotiated. At 303, a protocol link layer is negotiated. Examples of protocol link layers that may be negotiated are SONET/SDH framing layer, Fiber Channel signaling protocol layer, and Ethernet Medium Access Control ("MAC") layer, among others. For example, for Fiber Channel layer FC-2 is a signaling protocol level for a transport mechanism, including, but not limited to, framing rules for transferring data between ports, which are negotiated. Optionally, high level functions may be negotiated at 304. For example, for Fiber Channel FC-3 and FC-4 have higher level functions.

Auto-negotiation flow 300 may be run at startup of FPGA 100A, and then may continue to run in the background. Accordingly, at 305, a query may be made to determine if a link is to be established for one or more of transceivers 222A. If a link is to be established, auto-negotiation proceeds at 301. If, however, no link is to be established or auto-negotiation to establish a link is finished, then auto-negotiation flow 300 returns to 305.

Figure 4:
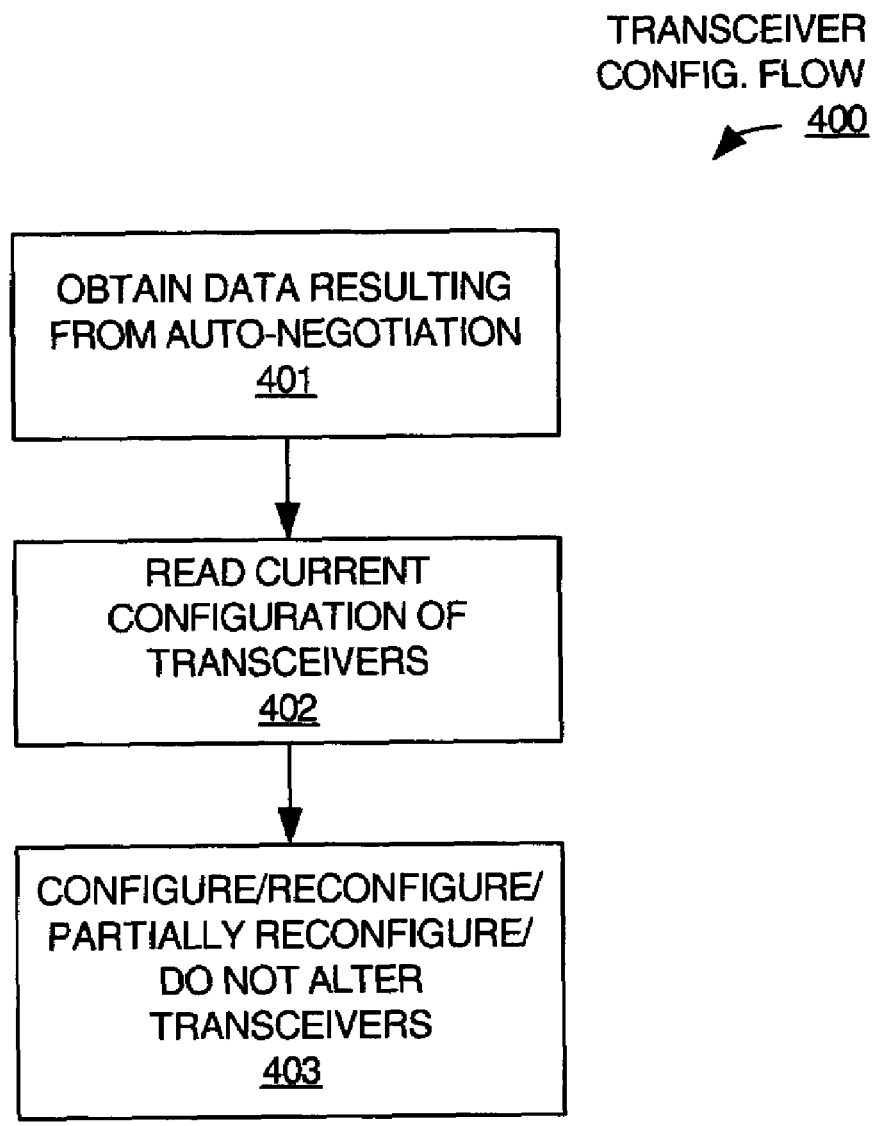
FIG. 4 is a flow diagram depicting an exemplary embodiment of a transceiver configuration flow.

At each of 301, 302, 303 and 304 data is stored. Such data may be stored in register memory of programmable circuitry 221A. This data may be obtained for selecting a configuration for transceivers 222A of FPGA 100A. Referring to FIG. 4, there is shown a flow diagram depicting an exemplary embodiment of a transceiver configuration flow 400. At 401, data results from an auto-negotiation are obtained. AT 402, configuration of transceivers 222A is read. At 403, all or a portion of transceivers 222A are either configured, reconfigured or partially reconfigured. Transceivers 222A are configured if not currently configured at all for establishing a link. Transceivers 222A are reconfigured if presently configured, but such present configuration cannot be used for an auto-negotiated configuration to be instantiated. Transceivers 222A are partially reconfigured if presently configure, and such present configuration can be used in part for an auto-negotiated configuration to be instantiated. A further description of partial reconfiguration of programmable functions of the MGT is described in co-pending, commonly assigned, U.S. patent application Ser. No. 10/319,051, titled "Partial Reconfiguration of a Programmable Logic Device Using an On-Chip Processor," by Derek R. Curd, et. al., filed Dec. 13, 2002, which is herein incorporated by reference. Notably, if transceivers are already properly configured, auto-negotiation data collected is used to determine which of transceivers 222A may be employed without any such configuring at 403. Thus, it should be appreciated that all of transceivers 222A could be configured at once or portions of transceivers 222A could be configured on an on-demand basis, where capabilities are auto-negotiated on demand. Furthermore, it should be appreciated that not all of transceivers 222A need to be configured for the same type of link. For example, portions of transceivers 222A may be for one or more of SONET, SDH, Ethernet, Fiber Channel, ATM, PCI Express, and InfiniBand, among other types of links. Thus, auto-negotiation may be employed to select a mode of a link type from one or more modes from among a plurality of link types, and portions of transceivers 222A may be used for various modes of a link type, as well as various link types.

Figure 5:
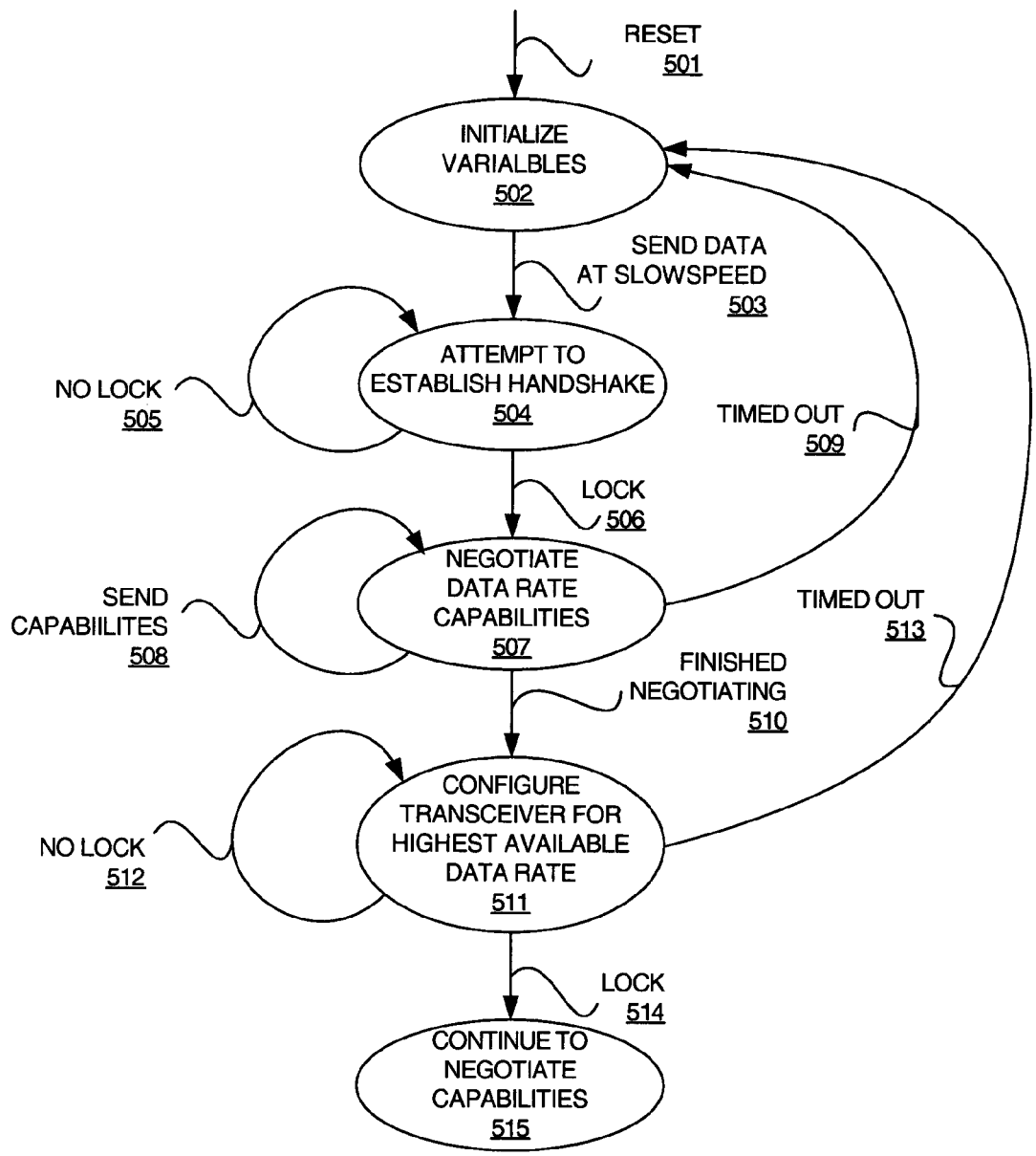
FIG. 5 is a state diagram depicting an exemplary embodiment of an auto-negotiation for data rate.

FIG. 5 is a state diagram depicting an exemplary embodiment of an auto-negotiation for data rate. Variables are initialized at 502 responsive to reset 501. Data is sent 503 at a slow speed, for example a slowest available data rate of FPGA 100A transceivers 222A, and at 504 an attempt is made to establish a handshake link with another node, for example FPGA 100B. If no lock occurs, then a no lock condition 505 maintains state 504. If a handshake link is established, then a lock condition 506 causes negotiation of data rate capabilities 507. Lock indicator signal 229A indicates such a lock condition 506 to cause negotiation of data rate capabilities by programmable circuitry 221A.

Data rate capabilities are sent at 508 for negotiating with another node. If no response is received within a threshold time, or if negotiation fails, a timed out condition 509 occurs causing a re-initialization of variables 502. If a negotiation finished condition 510 occurs, then all or a portion of transceivers 222A are configured initially for a highest negotiated data rate at 511. If a no lock condition 512 occurs after a threshold time, a next highest available data rate may be set at 511. State 511 persists until a lock condition 514 is obtained for a data or until a timed out condition 513 occurs, for example due to line problems. If a lock condition 514 occurs, then a state 515 of negotiating capabilities continues.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A programmable logic device, comprising:
    transceivers;
    programmable circuitry coupled to the transceivers; and
    memory coupled to the transceivers;
    the programmable circuitry configured to receive a frequency locked signal from at least one of the transceivers and to establish a data rate responsive to the frequency locked signal; and
    the programmable circuitry programmed to send and receive session information to and from the transceivers to establish a communication session;
    wherein transceiver attributes are stored in the memory, the transceiver attributes for a plurality of physical links and a plurality of communication protocols; and
    wherein the programmable circuitry is coupled to the transceivers with a data input bus and a data output bus.

2. The programmable logic device, according to claim 1, wherein the data rate, comprising a low data rate, is used to establish a handshake link, and wherein the programmable circuitry is further configured to establish another higher data rate to use during the communication session.

3. The programmable logic device, according to claim 1, wherein the plurality of communication protocols including encoding schemes and link layers.

4. The programmable logic device, according to claim 1, wherein the memory, the programmable circuitry and the transceivers are part of a field programmable gate array integrated circuit.

5. The programmable logic device, according to claim 1, wherein the programmable circuitry is coupled to the transceivers with a memory bus interface, the programmable circuitry configured to provide transceiver attribute information of the session information to the transceivers via the memory bus interface, the transceivers in response to the transceiver attribute information configured to generate a select signal to select from the transceiver attributes stored in the memory a physical link and a communication protocol for the communication session.

6. The programmable logic device, according to claim 5, wherein the physical link and the communication protocol for the communication session are selected from Ethernet, SONET, SDH, ATM, Fiber Channel, PCI Express, and InfiniBand.

7. A method for establishing a communication session, comprising:
    programming a programmable logic device for:
        negotiating at least one channel property;
        negotiating at least one encoding scheme; and
        negotiating a protocol link layer;
    setting a data rate responsive to the at least one channel property negotiated;
    selecting transceiver attributes in response to the at least one encoding scheme and the protocol link layer; and
    configuring at least one transceiver in response to the transceiver attributes selected.

8. The method, according to claim 7, wherein the channel property is selected from signal swing/bit rate, transmit pre-emphasis, and receive post-equalization.

9. The method, according to claim 7, wherein the encoding scheme is for one of Ethernet, SONET, SDH, ATM, Fiber Channel, PCI Express, and InfiniBand.

10. The method, according to claim 7, wherein the protocol link layer is for one of Ethernet, SONET, SDH, ATM, Fiber Channel, PCI Express, and InfiniBand.

11. The method, according to claim 7, wherein the selecting transceiver attributes is further in response to the at least one channel property.

12. The method, according to claim 7, further comprising storing session information associated with the at least one channel property, the at least one encoding scheme and the protocol link layer.

13. The method, according to claim 12, further comprising negotiating at least one higher-level function for the protocol link layer negotiated.

14. The method, according to claim 7, wherein the negotiating at least one channel property is initiated in response to a query for the communication session to be established for one or more transceivers.

15. A method for configuring a line interface having programmable logic circuitry and transceivers, comprising:
    obtaining session information for a first communication session;
    selecting transceiver attributes in response to the session information;
    reading a current configuration of a portion of the transceivers; and
    configuring the portion of the transceivers in response to the transceiver attributes selected and the current configuration read.

16. The method, according to claim 15, wherein the session information comprises at least one channel property, at least one encoding scheme and a protocol link layer.

17. The method, according to claim 15, further comprising:
obtaining other session information for a second communication session;
selecting other transceiver attributes in response to the other session information;
reading a current configuration of another portion of the transceivers; and
configuring the other portion of the transceivers in response to the other transceiver attributes selected and the current configuration read for the other portion of the transceivers, the portion and the other portion of the transceivers being configured for different communication sessions.

18. The method, according claim 15, wherein the configuring is a partial reconfiguration to provided configured transceivers for a communication session.

19. A line interface, comprising:
an integrated circuit board, the integrated circuit board having attached thereto a programmable logic device, the programmable logic device having programmable circuitry and transceivers and having access to memory coupled to the programmable logic device;
the programmable circuitry programmed to establish a communication session by receiving a frequency locked signal from at least one of the transceivers and establishing a data rate responsive to the frequency locked signal; and
the programmable circuitry programmed to send and receive session information to and from the transceivers to establish the communication session, wherein transceiver attributes are stored in the memory, the transceiver attributes for a plurality of physical links and a plurality of communication protocols; and wherein the programmable circuitry is coupled to the transceivers with a data input bus and a data output bus.

20. The programmable logic device, according to claim 19, wherein the programmable circuitry is coupled to the transceivers with a memory bus interface, the programmable circuitry configured to provide transceiver attribute information of the session information to the transceivers via the memory bus interface, the transceivers in response to the transceiver attribute information configured to generate a select signal to select from the transceiver attributes stored in the memory a physical link of the plurality of physical links and a communication protocol of the plurality of communication protocols for the communication session.

21. A line interface for establishing a communication session, comprising:
means for programming a programmable logic device to:
negotiate at least one channel property;
negotiate at least one encoding scheme; and
negotiate a protocol link layer;
means for setting a data rate responsive to the at least one channel property negotiated;
means for selecting transceiver attributes in response to the at least one encoding scheme and the protocol link layer; and
means for configuring at least one transceiver in response to the transceiver attributes selected.

* * * * *